Patented Sept. 6, 1932

1,875,776

UNITED STATES PATENT OFFICE

LLOYD C. SWALLEN, OF TERRE HAUTE, INDIANA, ASSIGNOR TO COMMERCIAL SOLVENTS CORPORATION, OF TERRE HAUTE, INDIANA, A CORPORATION OF MARYLAND

RECOVERY OF METHYL AMINE

No Drawing. Application filed October 2, 1930. Serial No. 486,060.

This invention relates to a method for the recovery of methyl amine from mixtures containing ammonia. More specifically, this invention relates to a process for the recovery of methyl amine from the mixtures obtained in the catalytic synthesis from methanol and ammonia.

Methyl amine may be prepared from formaldehyde and ammonium chloride, from methyl cyanate, by the reduction of hydrocyanic acid, by the action of ammonia on methyl iodide, methyl chloride, methyl nitrate, etc. However, it may best be made upon a commercial scale by catalytic synthesis from methanol and ammonia, as disclosed in co-pending applications, Serial Nos. 468,992 and 468,993, filed July 18, 1930, by Jerome Martin and Lloyd C. Swallen. In this method, methanol vapor and ammonia are passed over metallic oxide dehydrating catalysts or over aluminium silicate at temperatures of from 300° to 500° C. The mixture leaving the catalyst is found to comprise methyl amine (a mixture of mono-, di- and tri-methyl amines), ammonia, any unconverted methanol, the water which is formed in the reaction, and any decomposition products of the methanol or ammonia, such as hydrogen and carbon monoxide.

The recovery of methyl amine from such ammonia-containing mixtures has presented a problem which has not been satisfactorily solved until the present time. Expensive and complicated methods involving the formation of the salts and fractional crystallization or selective solution have been employed. These methods, however, are obviously disadvantageous from the standpoint of commercial production.

The present invention comprises a satisfactory and economical method for the separation of methyl amine from ammonia. By "methyl amine" is meant the mono-, di-, tri-, or any mixture of these. However, the monomethyl amine is of primary importance at the present time from a commercial standpoint, and the present method is devised to recover a mixture containing substantially all of the mono-compound.

It has been found that the lower aliphatic alcohols selectively absorb methyl amine from a mixture containing methyl amine and ammonia and that the ammonia which is absorbed by the alcohol may be displaced by methyl amine by countercurrent scrubbing. The method of carrying out this invention may best be illustrated by the following example.

The mixture coming from the catalyst in the catalytic synthesis of methyl amine from methanol and ammonia is cooled to condense out the water formed in the reaction, any unconverted methanol, and any by-products of the reaction which may be removed by condensation at the temperature of the available cooling water. The mixture is then introduced into an intermediate plate of a bubble-cap plate column. Methanol (preferably 100%) is allowed to flow down the column from the top and to collect in the steam jacketed kettle. The methyl amine is selectively absorbed by the methanol, but ammonia is also absorbed, so the latter is scrubbed out by a current of methyl amine gas. This is accomplished by heating the kettle containing the methanol solution of methyl amine. In this manner, fresh methanol enters the top of the column and the gas mixture at a middle plate; methyl amine vapor from the heated solution in the kettle passes up the column countercurrently to the down-flowing liquid, and displaces the ammonia from the solution; the ammonia, a certain amount of methanol vapor, traces of amine, and any non-condensable gases which were present in the original mixture are taken off at the top of the column. In this way, a methanol solution of methyl amine containing little or no ammonia is obtained in the kettle, and a gas mixture rich in ammonia is obtained at the top of the column.

This gas mixture is then treated by any of the known methods to recover the ammonia. For example, it may be scrubbed with water to remove the ammonia, amines, and methanol, allowing the non-condensable gases to vent out of the system. The water solution may then be fractionated to recover the ammonia and methanol which may then be used again in the synthesis. In normal operation the recovered ammonia should not contain more than 0.5% methyl amine, so that this product need not be removed before passing the gas over the catalyst.

In operating, it is apparent that the capacity of the column will govern the rate of flow of the incoming gas mixture; that is, the mixture will be introduced at a rate somewhat below the maximum, which is the rate at which the ammonia content represents (to all practical purposes) the capacity value of the column, i. e., the vapor velocity at which there is no choking or entrainment. The methanol will be introduced at the top of the column at such a rate as to give a substantially constant composition on each plate and to yield a concentrated solution of amines at the bottom of the column; it is preferred to regulate the methanol flow so as to give a practically saturated solution, for example 10 N. The rate of distillation of the amines from the methanol solution in the kettle will depend upon the number of plates and the efficiency of the column, i. e., the amine vapor must be sufficient to displace all of the ammonia, and yet the vapor velocity must not be great enough to prevent substantially total absorption of the amines, so that the recovered ammonia will contain not more than 0.5% of amines. It is seen that operating conditions will be somewhat different for any particular column employed, but that one skilled in the art may easily adjust the conditions to give optimum results.

It is preferred to operate at atmospheric temperature and pressure, with just sufficient heat supplied to the kettle to give the desired vapor velocity of methyl amine without a substantial reflux of methanol. The method may be made continuous, if desired, by withdrawing the methanol solution continuously from the kettle. In this case a separate column will be required for the recovery of the amines from the methanol solution, whereas in the batch method the amines may be distilled off the methanol in the same column which was used for the scrubbing.

It is to be understood that the above example is cited merely as illustrative of the method of carrying out the invention and that the procedure may be modified in many respects without departing from the spirit of the invention. For example, it is preferred to use methanol since traces which are not removed from the recovered ammonia will have no detrimental effect in passing over the catalyst; however, others of the lower aliphatic alcohols may be used, for example, ethyl, iso-propyl, propyl, normal butyl, iso-butyl, etc. Also, although it is preferred to use substantially pure alcohol, a lower concentration, for example 90% or even 80%, may be used if it is found to be economically feasible when taking into account the lowered efficiency of the operation. In the latter case, the initial condensation of the water from the gas mixture leaving the catalyst would be unnecessary. The operation could also be carried out under increased or reduced temperatures and pressures, but economic considerations also prevail in this case, and it is preferred to use the conditions specified.

Further modifications which would occur to one skilled in the art, such as the use of different types of apparatus, etc., may also be employed. For example, in view of the delicate balance of rate of gas feed, rate of methanol feed, and rate of distillation of the scrubbing gas required to keep a substantially constant composition on the plates, it may be found advantageous to use a column which is so constructed as to hold a large amount of liquid on each plate. In this way the concentrations from plate to plate would change only slowly even if optimum operating conditions were not employed. The same effect would be obtained by the use of a series of tanks through which the gases would bubble in series, ammonia coming off at one end, the feed going in the middle, and the amine solution coming off at the other end. The solutions could be moved up from tank to tank either continuously or in batches, in the latter case the change being made when the final tank contained amine of the desired purity. It is thus seen that various modifications in the procedure may be employed without departing from the spirit or the scope of the invention.

The invention now having been described, what is claimed is:

1. The process for the recovery of methyl amine from mixtures containing ammonia which comprises absorbing the methyl amine and at least a part of the ammonia in a liquid lower aliphatic alcohol, and displacing the ammonia from the resulting alcoholic solution by contacting said solution with gaseous methyl amine.

2. The process for the recovery of methyl amine from mixtures containing ammonia which comprises absorbing the methyl amine and at least a part of the ammonia in liquid methanol and displacing the ammonia from the resulting methanol solution by contacting said solution with gaseous methyl amine.

3. The process for the recovery of methyl amine from mixtures containing ammonia which comprises absorbing the methyl amine and at least a part of the ammonia in liquid ethyl alcohol and displacing the ammonia from the resulting alcoholic solution by contacting said solution with gaseous methyl amine.

4. The process for the recovery of methyl amine from mixtures containing ammonia which comprises absorbing the methyl amine and at least a part of the ammonia in liquid butanol and displacing the ammonia from the resulting butanol solution by contacting said butanol solution with gaseous methyl amine.

5. The process for the recovery of methyl amine from a mixture containing ammonia which comprises introducing said mixture at an intermediate point in a fractionating column, passing a liquid lower aliphatic alcohol down the column, passing gaseous methyl amine up the column, and recovering the resulting alcoholic solution of methyl amine from the bottom of the column.

6. The process for the recovery of methyl amine from a mixture containing ammonia which comprises introducing said mixture at an intermediate point in a fractionating column, passing liquid methanol down the column, passing gaseous methyl amine up the column, and recovering the resulting methanol solution of methyl amine from the bottom of the column.

7. The process for the recovery of methyl amine from a mixture containing ammonia which comprises cooling the mixture to condense out the products which are liquid at atmospheric temperature and pressure, introducing the gaseous mixture at an intermediate point in a fractionating column, passing a liquid lower aliphatic alcohol down the column, passing gaseous methyl amine up the column, and recovering the resulting alcoholic solution of methyl amine from the bottom of the column.

8. The process for the recovery of methyl amine from a mixture containing ammonia which comprises cooling the mixture to condense out the products which are liquid at atmospheric temperature and pressure, introducing the gaseous mixture at an intermediate point in a fractionating column, passing liquid methanol down the column, passing gaseous methyl amine up the column, and recovering the resulting methanol solution of methyl amine from the bottom of the column.

9. In a process for the recovery of methyl amine from mixtures containing ammonia the steps which comprise absorbing the methyl amine and at least part of the ammonia in a liquid aliphatic alcohol, and displacing the ammonia from the resulting alcoholic solution by contacting said solution with gaseous methyl amine.

10. In a process for the recovery of methyl amine from mixtures containing ammonia the steps which comprise absorbing the methyl amine and at least part of the ammonia in liquid methanol, and displacing the ammonia from the resulting methanol solution by contacting said solution with gaseous methyl amine.

11. In a process for the recovery of methyl amine from a mixture containing ammonia, the steps which comprise introducing said mixture at an intermediate point in a fractionating column, passing a liquid lower aliphatic alcohol down the column, passing gaseous methyl amine up the column, and recovering the resulting alcoholic solution of methyl amine from the bottom of the column.

12. In a process for the recovery of methyl amine from a mixture containing ammonia, the steps which comprise introducing said mixture at an intermediate point in a fractionating column, passing liquid methanol down the column, passing gaseous methyl amine up the column, and recovering the resulting methanol solution of methyl amine from the bottom of the column.

In testimony whereof I affix my signature.

LLOYD C. SWALLEN.